Nov. 21, 1961 W. G. CUNNINGHAM 3,009,469
VEHICLE WASHING APPARATUS
Filed Feb. 8, 1957 4 Sheets-Sheet 1
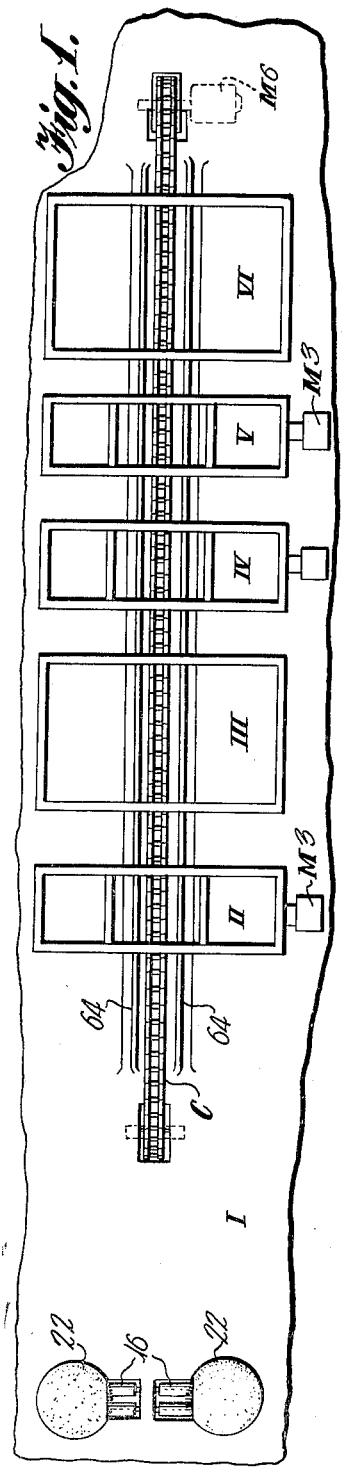
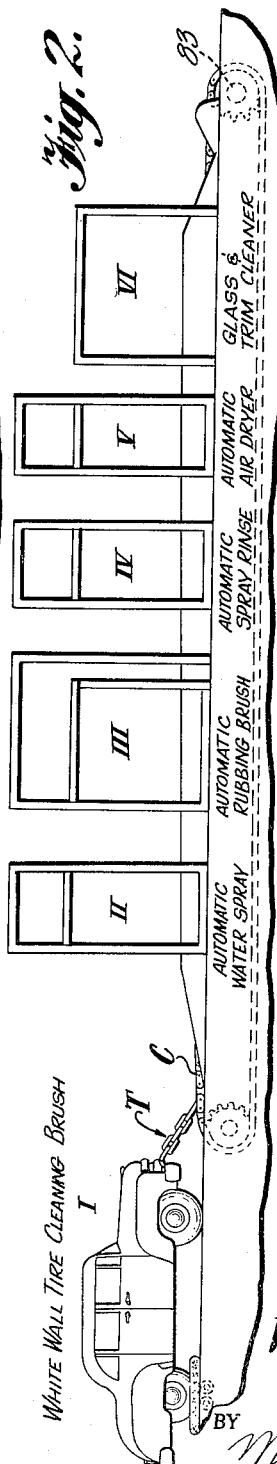
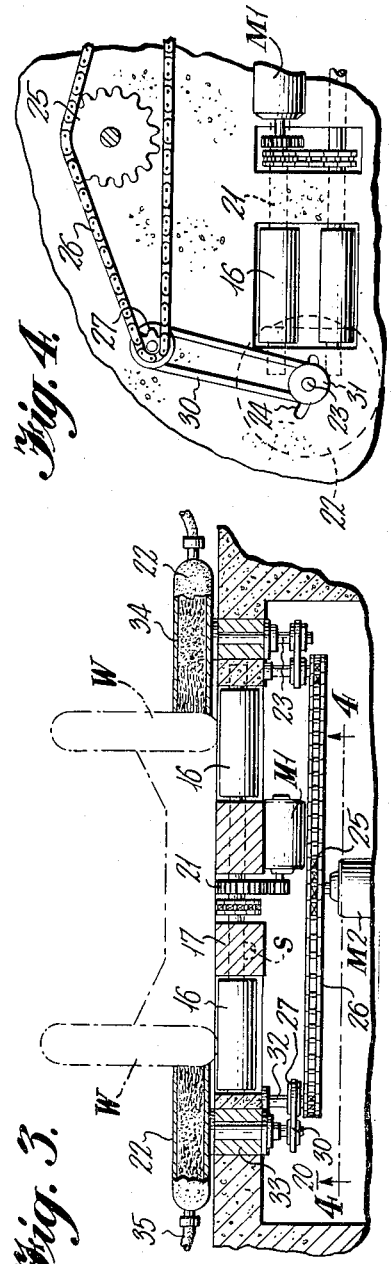
INVENTOR
William G. Cunningham
BY
Mason, Fenwick & Lawrence
ATTORNEYS Nov. 21, 1961 W. G. CUNNINGHAM 3,009,469
VEHICLE WASHING APPARATUS
Filed Feb. 8, 1957 4 Sheets-Sheet 2
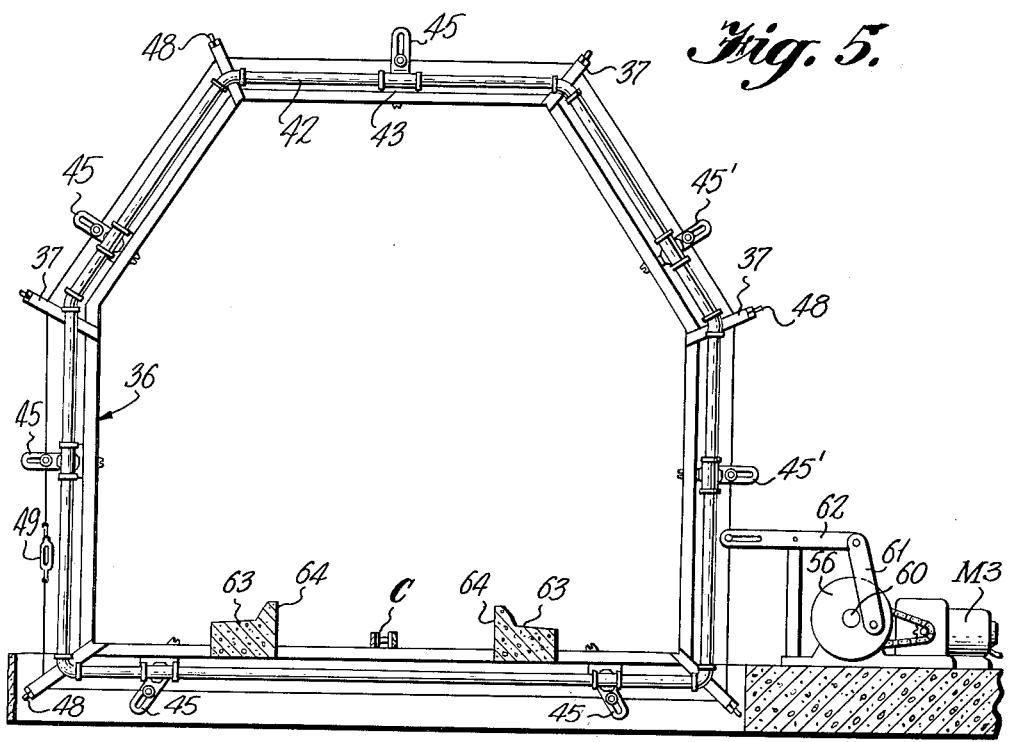
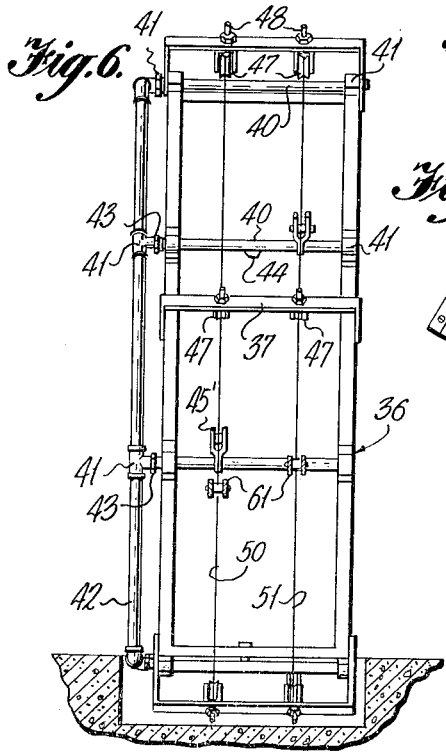
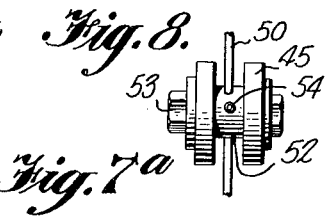
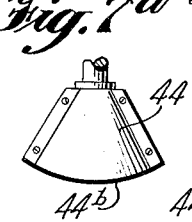
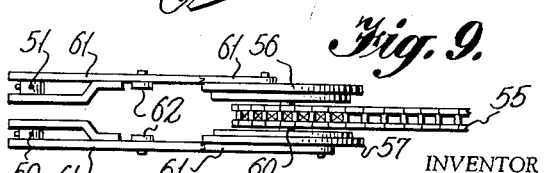
INVENTOR
William G. Cunningham
BY Mason, Fenwick & Lawrence
ATTORNEYS

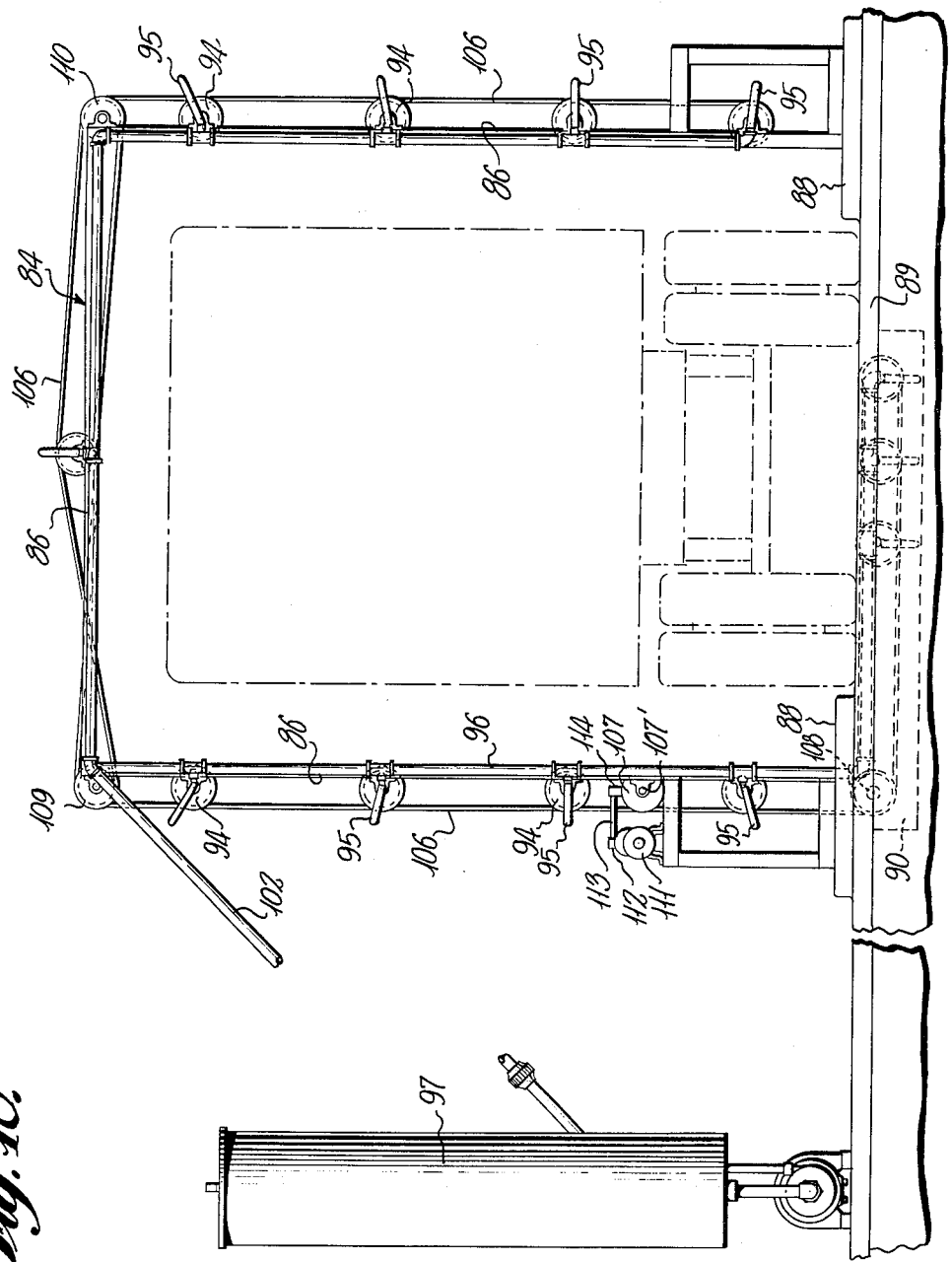

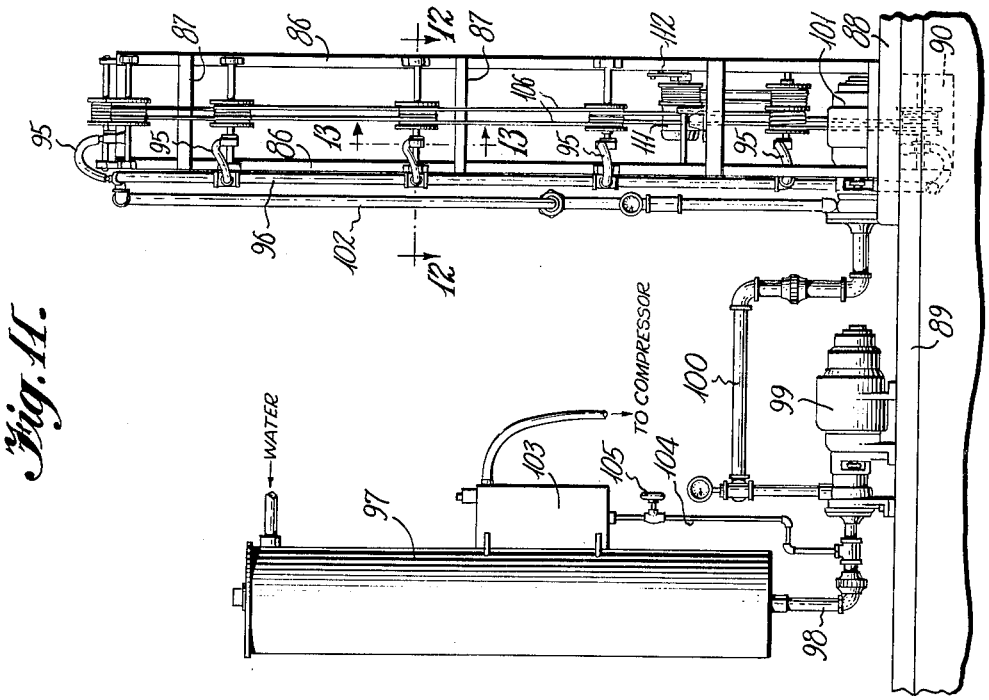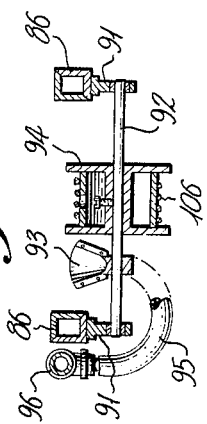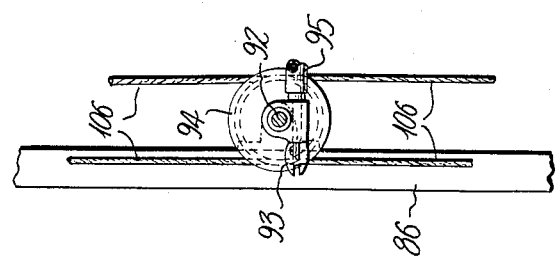

United States Patent Office 3,009,469
Patented Nov. 21, 1961

3,009,469
VEHICLE WASHING APPARATUS
William G. Cunningham, 475 Cleveland Ave. SE.,
Atlanta, Ga.
Filed Feb. 8, 1957, Ser. No. 639,107
5 Claims. (Cl. 134—123)

This invention relates generally to vehicle cleaning apparatus and more particularly to an improved apparatus for washing vehicles, and is a continuation-in-part of my prior application Serial No. 303,721, filed August 11, 1952, now abandoned.

Apparatus of this general type is known in the art, and is usually characterized by a number of inherent disadvantages. Among these are an excessive cost due to an unnecessarily elaborate system, an inefficient arrangement and operation of the various elements of the system, the disinclination to make use of operators in the cleaning of vehicle portions which from a practical standpoint are virtually inaccessible, and an unnecessarily large number of elements comprising the apparatus which result in useless space and maintenance problems.

Accordingly, the chief object of the present invention is to provide an improved vehicle washing apparatus which will obviate the above mentioned disadvantageous features of known apparatus.

Another important object of the present invention is to provide an improved washing apparatus in which the various elements are sequentially arranged for operation upon vehicles successively presented to the elements.

A still further important object of the present invention is to provide an improved apparatus of the type described which includes a minimum number of water nozzles which are oscillatable to increase their effectiveness and include means to vary the degree of oscillation.

A further object of this invention is to provide an improved water nozzle whereby a thin sheet of water may be directed over the entire car and delivers a spray which will cover at the same time about three feet or more of the car and will permit the application of any amount of pressure giving a complete rinse of the exterior of the car without damage to the gloss or finish thereof.

Other objects and advantages of the invention will become apparent during the course of the following description.

In the drawings, I have shown several embodiments of the invention. In this showing:

FIGURE 1 is a diagrammatic plan view of one form of the apparatus comprising the present invention;

FIGURE 2 is a diagrammatic elevational view thereof;

FIGURE 3 is a transverse vertical sectional view of the first station apparatus, parts being shown in elevation;

FIGURE 4 is a bottom plan view thereof;

FIGURE 5 is a side elevational view of either one of the automatic water spray station's apparatus, showing the means for oscillating the water nozzles;

FIGURE 6 is an end elevational view thereof;

FIGURE 7 is an enlarged side elevational view of the means for adjusting the degree of oscillation of the water nozzles;

FIGURE 7A is a plan view of one of the water nozzles;

FIGURE 8 is a top pan view of FIGURE 7;

FIGURE 9 is an enlarged plan view of the nozzle oscillating means;

FIGURE 10 is a view similar to FIGURE 5 showing a slightly modified form of washing apparatus;

FIGURE 11 is a side view of the structure shown in FIGURE 10;

FIGURE 12 is a horizontal section through one of the spray nozzle mountings, and is taken on the line 12—12 of FIGURE 11; and FIGURE 13 is a vertical section taken on the line 13—13 of FIGURE 11.

Referring to FIGURES 1 and 2 of the drawings, the cleaning apparatus comprising, one form of the present invention includes an endless towing conveyor chain C above and along which the apparatus is arranged in a series of stations for operation upon a vehicle.

As will be further described, the first station I at which interior cleaning of the vehicle is effected, includes white wall tire brushing apparatus. The towbar T is here engaged, after the tire washing is completed, with the conveyor C which tows the vehicle past station II to receive a body wash by means of an automatic spray apparatus, past station III for a body brushing by an automatic rubbing brush, past station IV where the vehicle is rinsed by a second automatic water spray, past station V comprising an automatic air drier, past station VI where the glass and trim of the vehicle are cleaned, and finally to the end of the upper reach of the conveyor C where the towbar T is automatically disengaged and the car is driven away.

As seen in FIGURES 1–4 inclusive, station I comprises two pairs of transversely spaced vehicle wheel supporting rollers 16, the rollers of each pair extending transversely and being longitudinally spaced to receive a wheel. The rollers are suitably journalled in the upper floor 17 of a pit 20 and are connected by shafts and gearing 21 to the motor M for rotation in the same direction.

A pair of transversely spaced rotary brushes 22 are mounted on shafts 23 in arcuate slots 24 formed in the floor 17 and each is simultaneously driven by a motor M2 through a sprocket 25, chain 26, sprockets 27 and chains 30, driving sprockets 31 which are fixed to the bottom ends of the shafts 23. The sprockets 27 are fixed to shafts 32 the upper ends of which are suitably journalled in the floor 37. Suitable spring means 33 act against the brush shafts 23 to resiliently urge the brushes 22 against the vehicle wheels W during their rotation as effected by the wheel supporting rollers 16.

Each of the brushes 22 is encased in a generally circular casing 34, formed preferably of rubber, which is provided with a flexible fluid inlet conduit 35 to permit the arcuate swinging movement of the brushes under the influence of the spring 33. The cleaning fluid thus furnished is picked up by the rotary brushes to thoroughly and quickly clean the vehicle tires, this action being facilitated by having the wheels W rotate on the rollers 16 in a direction contra to the direction of rotation of the brushes 22. The casings 34 fit against the tire snugly and thus prevent water from being scattered and splashed about to any great extent. By reason of the fact that the rubber casing or cap 22 fits snugly up against the wheel, the water is forced in a churn-like motion through the small opening therein while the brush is rubbing against the tire so that the force of the water on that one space of the tire results in a much better cleaning job in a shorter period of time.

The motors M, and M2 are automatically energized to drive the rollers 16 and the brushes 22 respectively by means of a switch S which is positioned beneath the roller journal and adapted to be closed when the weight of the vehicle wheels is received upon the rollers 16. When the front vehicle wheels have been cleaned, the vehicle is moved forwardly until the rear wheels are received upon the rollers for cleaning as shown in FIGURE 2. Upon completion of the cleaning of the interior of the vehicle and of the tires, the towbar T is connected between the vehicle bumper and the conveyor chain C.

The automatic water spray stations II and IV are identical and hence only one will be described. As seen in FIGURES 5 and 6, each comprises a double, connected and generally rectangular framework 36 having inclined upper sides, and longitudinally extending frame members 37 connecting the spaced double frame 36 at the corners thereof. A plurality of fluid conduits 40 are rotatably journalled in the frame 36 at spaced points, and the right ends (FIGURE 6) of each conduit are closed while their left ends are connected with a fluid supply main 42 by means of suitable swivel couplings 43, and T couplings 41, allowing rotation of fluid supply mains 42 without leakage of the water.

Mounted on each conduit 40 midway of its length and inwardly directed is a nozzle 44 while outwardly directed and also fixed to each conduit is a bracket 45, or 45' as the case may be, the legs of which enclose slots 46. It will be noted that the brackets are offset from the center of the frame, depthwise of the machine, with the brackets 45 being mounted to one side of the center and the brackets 45' on the other side of the center for connection to separate operating wires as will be described. A plurality of outrigger brackets 48 are fixed to the frame members 37 at the corners of the frame 36 and each supports a pair of spaced adjustably mounted pulleys 47 over which the operating wires 50 and 51 are run in endless adjustable loops encircling and outwardly spaced from the frame 36. Pulleys 47 may be moved outwardly on the outriggers 48 for the purpose hereinafter described. Each nozzle 44 is fan shaped as shown in FIGURE 7A and has a convexly curved and narrow discharge port 44a at its arcuate discharge end 44b. The discharge port may be of even width from end to end and, in one construction which has been found to be efficient, the port may be one and one-half inches long and twelve-thousandths of an inch wide. An elongated fan shaped spray nozzle of this construction enables the spray of a thin sheet of water over the entire car, and placing the water at an angle over the wheel, under the fender, and all over the car by oscillating the nozzles. This nozzle permits the spraying of about three feet on the car at once, and permits the use of any amount of pressure giving a complete rinse of the exterior of the car without damage to the gloss or finish.

In order to permit adjustment of the pulleys 47 along the outrigger 48, a turnbuckle 49 is employed to adjust the length of the wires 50 and 51. The wire 50 is connected to the operating bracket 45 (FIGURES 5–7) of the fluid conduits 40 on one side of the frame 36 and the adjacent bottom conduit, while the wire 51 is connected to the remaining operating brackets 45', in each instance by means of an apertured collar 53 adjustably mounted for oscillating in the slots 46 of the brackets 45, 45' by nuts 53. The wires pass through the collar 52 and are fixed thereto by locking screws 54. It thus will be apparent that reciprocation of either of the wires 50 or 51 will oscillate the operating brackets 45 or 45' to which they are connected to oscillate the fluid conduits 40 and their nozzles 44 in a vertical arc. Moreover, it will be obvious that the reciprocation of the wires must be relatively opposite in order that the nozzles 44 on opposite sides of the frame 36 oscillate upwardly or downwardly together.

To effect the simultaneous but opposite reciprocation of the wires 50 and 51, a motor M3 including a reduction gear is connected by a chain 55 to a pair of spaced disks 56 and 57 rotatably mounted on the driven sprocket shaft 60 of the chain 55. Crank pins are fixed on the disks 56 and 57 so as to be angularly spaced 180 degrees from each other, and are connected by angular links 61 pivoted to a support at 62 to the wires 50 and 51.

The angle of oscillation of the elongated fan shaped spray nozzles 44 may be readily adjusted by positioning of the pulleys 47 in the outriggers 48 and, hence, varying the position of collars 52 along the slots 46. Thus as a vehicle passes through the frame 36, oscillating sprays of water or other cleaning fluid are directed upon the top, sides and bottom so as to completely cover the entire surface of the vehicle.

The vehicle is towed from station II by the conveyor C along a ramp comprising spaced runways 63 having side guard flanges 64 to station III where the washed vehicle body is rubbed with an automatic rubbing brush. The detailed structure of the brush B forms no part of the present application.

The automatic rubbing brush B scours the mud and grime from the vehicle and it is then towed to station IV where it is subjected to the automatic spray rinse as described in connection with station II. After a thorough rinsing by the oscillating nozzles 44, the vehicle is towed to station V where it is subjected to the action of the automatic air drier.

When the conveyor C has towed the vehicle past station VI to the end of its upper flight, the towbar T is automatically disengaged from the conveyor (FIGURE 2) and the vehicle is ready to be moved away from the apparatus.

The sprocket shaft 83 may receive driving power from a motor M6 which may be manually or automatically controlled for intermittent or continuous operation as desired. It will be appreciated that the conveyor C may be mounted in a shallow pit as shown, or the runways 63 which may be of metal or concrete may be higher with the conveyor supported directly on the ground.

It is believed that the operation of the washing apparatus comprising the present invention is readily apparent from the foregoing. The apparatus enables the vacuuming of the car interior and the complete and efficient cleaning of the entire outer surfaces of the vehicle to be effected in a minimum amount of time. The automatic fluid spray means—water and air—effects a most efficient operation with a minimum of parts which are readily adjustable in accordance with job requirements.

FIGURES 10 through 13 show a slightly different structure. Here, the apparatus consists of a washing and/or rinsing rack 84. This rack may be arranged in any suitable manner so that a car, truck or bus may be driven through it. The buses, etc. can be driven through the rack 84 used as a washer and then through the same rack, or another just like it, for rinsing. If desired, rack 84 could be substituted for the washing and rinsing racks in the arrangement shown in FIGURES 1 and 2.

Wash rack 84 is built upon a pair of spaced, inverted, U-shaped frames 86, connected by a plurality of bridge members 87. The legs of the frame may be secured in any suitable manner upon concrete mounting blocks 88. These blocks rise from a concrete flooring or runway 89 in which there is formed a pit or sump 90. Pit 90 lies in the same vertical plane as the rack supporting frame.

At spaced points along the vertical legs of the U-shaped frame and across the top of the frame, bearing blocks 91 are mounted to rotatably receive shafts 92 which are positioned horizontally and span the frame members 86. Upon each of the shafts 92, a spray nozzle 93, similar to the nozzles 44 previously described, are rigidly mounted. Shafts 92 also carry pulleys 94, with all of the pulleys lying in the same vertical plane. Within the pit 90, three additional shafts 92 are mounted, each having a spray nozzle 93 and a pulley 94. The shafts will be so oriented that all of the spray nozzles are directed inwardly of the frame toward a vehicle within it.

Each of the spray nozzles is connected by a length of flexible hose 95 to a fluid manifold 96 which extends around the frame of one side of the rack to carry fluid to positions adjacent the respective nozzles. The manifold is supplied with fluid from a tank 97 which may be connected to any suitable source of supply. The fluid flows from tank 97 by means of a pipe 98 to a pump 99 and through a pipe 100 to a second, or booster, pump 101. The fluid is then forced through a pipe 102 to the manifold 96. In practice, the fluid has been supplied to the nozzles at a pressure of approximately 400 p.s.i.

A liquid soap container 103 is shown attached to the tank 97. A pipe line 104 carries the soap from the container to the pipe line 98 so that the soap is delivered to the fluid supply ahead of the pump 99. A valve 105 may be used in the line to control the soap delivery rate or to cut off the supply of soap if the apparatus is to be used for rinsing.

In this form, as in that previously described, the nozzles are oscillated to cause the spray to traverse the vehicle. Here a cable 106 is trained over the pulleys 94 and a drive pulley 107 mounted on a shaft 107' so that movement of the drive pulley will cause simultaneous movement of all of the nozzles. The cable is endless, and is given a few turns around the drive pulley 107. Referring particularly to FIGURE 10, the cable then proceeds downwardly where it is wrapped around the pulley 94 on the shaft below the drive pulley shaft, around an idler pulley 108 and around the pulley on the shafts in the pit 90. The cable is then wrapped around each of the pulleys on the return to the drive pulley. The cable continues upwardly around each of the pulleys on the left side of the frame, around idler 109 at the top, the top shaft pulley, idler 110 at the opposite top corner of the frame and downwardly around each pulley on the right hand side. The cable then leads back over each of the pulleys to its starting point at the drive pulley. It will be understood that the cable is given several turns around each pulley as it reaches it proceeding in both directions, to provide sufficient frictional hold to maintain positive nozzle operation. Pulley 107 is driven from a motor 111 by means of a crank 112 on the motor shaft, pitman 113 connected to crank 112 and a lever 114 on shaft 107'. Due to the respective lengths of crank 112 and lever 114, rotation of the crank causes oscillation of the drive pulley shaft. It is contemplated that oscillation shall be quite rapid.

It will be noted from FIGURE 10 that cable 106 is crossed over as it passes from idler 109 to pulley 94 at the top of the frame. This will provide reverse rotation on opposite sides of this point. Thus, the nozzles on opposite sides of the rack can be caused to move in unison and the nozzles on opposite sides to rise and fall simultaneously. This will provide the same movement as that described in connection with the washing apparatus of the first form of the invention.

With the washing arrangement shown in FIGURES 10 to 13, using high pressure and very rapid oscillation as described, the dirt will be loosened and floated off the vehicle without need for brushes. In some instances, some mopping or brushing of the front and back of the vehicle, not subject to the direct fluid spray, may be found necessary.

While in the above several embodiments of the invention have been disclosed, it will be understood that the precise details of construction shown and described are merely by way of illustration and the invention may take other forms within the scope of the appended claims.

What is claimed is:

1. A washing apparatus for vehicles comprising, a frame having bottom, side and top members forming an enclosure through which said vehicle is to pass, a plurality of nozzles mounted on the respective members of said frame, washing fluid supply means mounted on said frame and connected with said nozzles, a plurality of brackets mounted on said frame and operative to oscillate said nozzles, said brackets on one side of said frame being offset longitudinally of the apparatus with respect to the brackets on the opposite side of said frame, wires surrounding said frame spaced apart a distance equal to the offset between said brackets and lying in the same transverse planes as said brackets, the respective wires being connected to the brackets in their respective planes, and means for oscillating said wires in opposite directions.

2. The washing apparatus for vehicles as claimed in claim 1, wherein said oscillating means comprises a crank having throws displaced 180° apart and linkage connecting the throws of said crank to said wires.

3. The washing apparatus for vehicles as claimed in claim 1, wherein said brackets are slotted, said connections between said wires and said brackets being adjustable along said slots to vary the movement of said brackets upon oscillation of said wires, and there are take-up means in said wires to vary the length of said wires in accordance with the adjusted positions of said wire connections to said brackets.

4. A washing apparatus for vehicles comprising, a frame having side and top members forming an enclosure through which a vehicle may pass, a plurality of nozzles mounted on the respective members of said frame and intermediate the bottom ends of the side members, washing fluid supply means mounted on said frame and connected with said nozzles, a pulley mounted for rotative movement with each said nozzle, an endless cable each flight of which having at least one turn about each pulley, means to reciprocate said cable to cause oscillation of nozzles, said cable having its flights crossed above the top of said frame whereby the nozzles on one side of said frame will rise and fall with the nozzles on the opposite side of said frame.

5. The washing apparatus as claimed in claim 4, wherein said means to reciprocate said cable comprises a motor having a crank thereon, a lever on one of said pulleys, and means interconnecting said crank and lever.

References Cited in the file of this patent

UNITED STATES PATENTS

| 798,674 | Haas | Sept. 5, 1905 |
| 1,736,356 | Mueller | Nov. 19, 1929 |
| 1,934,494 | Gillespie | Nov. 7, 1933 |
| 1,969,649 | Johnson | Aug. 7, 1934 |
| 2,137,104 | Zademach | Nov. 15, 1938 |
| 2,440,157 | Rousseau | Apr. 20, 1948 |
| 2,676,600 | Vani | Apr. 27, 1954 |
| 2,689,577 | Dunn | Sept. 21, 1954 |
| 2,751,915 | Roberts | June 26, 1956 |
| 2,803,892 | Hurst | Aug. 27, 1957 |

FOREIGN PATENTS

| 437,672 | Germany | Nov. 25, 1926 |
| 509,564 | Great Britain | July 18, 1939 |